United States Patent Office 3,102,116
Patented Aug. 27, 1963

3,102,116
PROCESS FOR THE PURIFICATION OF 7-CHLORO-1-METHYL-5-PHENYL-1,4-3H-BENZODIAZEPIN-2(1H)-ONE
George Chase, Hawthorne, N.J., assignor to Hoffmann-La Roche Inc., Nutley, N.J., a corporation of New Jersey
No Drawing. Filed Mar. 12, 1962, Ser. No. 179,189
7 Claims. (Cl. 260—239.3)

This invention relates to a method for purifying a useful heterocyclic organic chemical. More particularly, this invention relates to a method of purifying 7-chloro-1-methyl-5-phenyl-1,4-3H-benzodiazepin-2(1H)-one, which compound is useful as a sedative, muscle relaxant and anticonvulsant. It is well known that compounds intended for such uses must be manufactured in a high degree of purity. Due to impurities present in crude 7-chloro-1-methyl-5-phenyl-1,4-3H-benzodiazepin-2(1H)-one, the industrial manufacture of said compound in large quantities has necessitated cumbersome purification procedures. Accordingly, a purpose of the present invention is to provide a simple procedure for the purification of 7-chloro-1-methyl-5-phenyl-1,4-3H-benzodiazepin-2(1H)-one.

More particularly the instant invention relates to a process which comprises treating crude 7-chloro-1-methyl-5-phenyl-1,4-3H-benzodiazepin-2(1H)-one with dilute hydrochloric acid, separating the resulting insoluble material, treating the resulting liquor with a mineral acid selected from the group consisting of nitric acid and sulfuric acid, isolating the resulting insoluble material and mixing same in the presence of lower alkanol with a base; heating the resulting mixture to a temperature sufficient to effect complete conversion; permitting the resulting solution to cool; and separating the purified 7-chloro-1-methyl-5-phenyl-1,4-3H-benzodiazepin-2(1H)-one.

The crude 7-chloro-1-methyl-5-phenyl-1,4-3H-benzodiazepin-2(1H)-one referred to above is that obtained, after the removal of solvents, from the reaction mixture wherein 7-chloro-1-methyl-5-phenyl-1,4-3H-benzodiazepin-2(1H)-one is first formed. The removal of solvents is performed in any convenient conventional manner, such as evaporation, so as to yield solid crude 7-chloro-1-methyl-5-phenyl-1,4-3H-benzodiazepin-2(1H)-one which, besides the desired product, will contain impurities present in the starting materials as well as impurities formed during the reaction procedure. For the sake of illustration, though such forms no part of the instant invention, it can be pointed out that one reaction procedure of preparing 7-chloro-1-methyl-5-phenyl-1,4-3H-benzodiazepin-2(1H)-one consists in condensing 5-chloro-2-aminobenzophenone with glycine ethyl ester hydrochloride in the presence of pyridine to yield 7-chloro-5-phenyl-3H-1,4-benzodiazepin-2(1H)-one, which is in turn methylated to give 7-chloro-1-methyl-5-phenyl-1,4-3H-benzodiazepin-2(1H)-one.

In the first step of the purification procedure of this invention, crude 7-chloro-1-methyl-5-phenyl-1,4-3H-benzodiazepin-2(1H)-one is reacted with dilute hydrochloric acid to form the soluble salt, 7-chloro-1-methyl-5-phenyl-1,4-3H-benzodiazepin-2(1H)-one hydrochloride. It has been found that some of the impurities present in the crude 7-chloro-1-methyl-5-phenyl-1,4-3H-benzodiazepin-2(1H)-one do not form soluble salts. Accordingly, by separating the insoluble material from the mother liquor, these impurities can be removed. The treatment with dilute hydrochloric acid is preferably conducted at room temperature since this is the most convenient temperature at which to operate, and should be conducted with dilute hydrochloric acid preferably of a strength ca. 3 normal. The separation of the resulting insoluble material from the mother liquor containing the soluble 7-chloro-1-methyl-5-phenyl-1,4-3H-benzodiazepin-2(1H)-one hydrochloride is effected by any convenient conventional means, for example by filtration.

In a further step of the purification process of this invention, the liquor containing the soluble 7-chloro-1-methyl-5-phenyl-1,4-3H-benzodiazepin-2(1H)-one hydrochloride and some retained impurities is treated with a mineral acid selected from the group consisting of nitric acid and sulfuric acid. For reasons more fully explained below, the use of nitric acid is a preferred embodiment of this invention. The mineral acid treatment results in the formation of an insoluble salt of 7-chloro-1-methyl-5-phenyl-1,4-3H-benzodiazepin-2(1H)-one, namely in the formation of 7-chloro-1-methyl-5-phenyl-1,4-3H-benzodiazepin-2(1H)-one nitrate or 7-chloro-1-methyl-5-phenyl-1,4-3H-benzodiazepin-2(1H)-one sulfate. The treatment is conveniently conducted at room temperature. It has been found that certain of the impurities retained do not form insoluble moieties with the named mineral acids. Accordingly, by simply isolating the insoluble material resulting from said mineral acid treatment from the mother liquor, further purification is obtained. This isolation can be effected by any convenient conventional method, such as for example filtration.

The solid 7-chloro-1-methyl-5-phenyl-1,4-3H-benzodiazepin-2(1H)-one nitrate or 7-chloro-1-methyl-5-phenyl-1,4-3H-benzodiazepin-2(1H)-one sulfate thus obtained is then mixed in the presence of lower alkanol with a base, and the resulting mixture heated to a temperature sufficient to effect complete conversion. The base will react with the nitrate or sulfate to form a corresponding salt and the free base, 7-chloro-1-methyl-5-phenyl-1,4-3H-benzodiazepin-2(1H)-one. For example, if ammonia is used as the base, ammonium nitrate or ammonium sulfate will be formed. As mentioned above, the use of nitric acid is a preferred embodiment of the instant invention due to the solubility of ammonium nitrate in lower alkanol, thereby facilitating the ready separation of the insoluble base, 7-chloro-1-methyl-5-phenyl-1,4-3H-benzodiazepin-2(1H)-one, from the salt, i.e. ammonium nitrate, formed in the lower alkanolic reaction media. When sulfuric acid is used in the mineral acid treatment and ammonia is used as the base, ammonium sulfate, which is insoluble in lower alkanol, is the salt formed. Inasmuch as this latter salt is also insoluble in hot lower alkanol, it has been found suitable to treat the co-crystallized 7-chloro-1-methyl-5-phenyl-1,4-3H-benzodiazepin-2(1H)-one and ammonium sulfate with hot lower alkanol, and to remove the insoluble ammonium sulfate therefrom. The so-dissolved 7-chloro-1-methyl-5-phenyl-1,4-3H-benzodiazepin-2(1H)-one then crystallizes out upon cooling of the lower alkanol. Due to its ready availability on the market and its ease of handling, ethanol is the preferred lower alkanol.

As stated above, the mixture of the 7-chloro-1-methyl-5-phenyl-1,4-3H-benzodiazepin-2(1H)-one nitrate or sulfate, lower alkanol and base is heated to a temperature sufficient to effect complete convertion of said ingredients. The temperature should, of course, not be so high as to volatilize any substantial proportion of the lower alkanol solvent being used. For example, when ethanol is used as the lower alkanol it has been found convenient to heat to between about 50° and about 70° C. In a further preferred embodiment of the invention it has been found that the use of aqueous ammonia as the base is especially suitable when nitric acid is used as the mineral acid. The ammonia, as stated above, forms a soluble salt with nitric acid and the water serves to both enhance the solubility of the ammonium nitrate in the lower alkanol, and simultaneously to decrease the solubility of the desired base, 7-chloro-1-methyl-5-phenyl-1,4-3H-benzodiazepin-2(1H)-one.

The above described treatment with a base and subsequent heating to effect complete conversion, will yield a solution which upon cooling gives 7-chloro-1-methyl-5-phenyl-1,4-3H-benzodiazepin-2(1H)-one in a crystal form which can be easily filtered and washed readily and rapidly. The cooling can occur by letting the solution stand at room temperature or it can be accelerated by any convenient cooling means, for example, refrigeration or ice bath. The crystalline 7-chloro-1-methyl-5-phenyl-1,4-3H-benzodiazepin-2(1H)-one base thus obtained is free of substantially all impurities occurring in the crude 7-chloro-1-methyl-5-phenyl-1,4-3H-benzodiazepin-2(1H)-one. In order to insure substantially complete freedom from the salt, e.g. ammonium nitrate, formed in the last step of this purification procedure, the crystallized 7-chloro-1-methyl-5-phenyl-1,4-3H-benzodiazepin-2(1H)-one can be washed with water. In fact, the so-obtained 7-chloro-1-methyl-5-phenyl-1,4-3H-benzodiazepin-2(1H)-one is in a crystalline form found particularly susceptible to washing, inasmuch as there is relatively little agglomeration or paste formation, so that the washing liquid can be passed readily and rapidly through the crystalline 7-chloro-1-methyl-5-phenyl-1,4-3H-benzodiazepin-2(1H)-one.

By the above procedure 7-chloro-1-methyl-5-phenyl-1,4-3H-benzodiazepin-2(1H)-one is obtained in a purified state. As will be appreciated by those skilled in the art, the above described treatment procedures are susceptible to manipulative variations, for example, insoluble materials can be rewashed with mother liquor solvents to insure complete removal of solutes. Such variations and manipulative procedures are apparent to those skilled in the art and are within the scope of the instant invention. The following example is illustrative of the instant invention, but not limitative thereof. All temperatures are in degrees centigrade.

*Example 1*

100 g. of crude 7-chloro-1-methyl-5-phenyl-1,4-3H-benzodiazepin-2(1H)-one, assaying about 90% pure and melting at 115°–120° (uncorr.), was dissolved with stirring at room temperature in 300 ml. of ca. 3 N aqueous hydrochloric acid. The resulting solution was then filtered and the insoluble material remaining on the filter was washed with an additional 50 ml. of ca. 3 N hydrochloric acid. The strongly colored filtrate and wash were combined and 50 ml. of 70% nitric acid slowly added thereto with stirring whereupon 7-chloro-1-methyl-5-phenyl-1,4-3H-benzodiazepin-2(1H)-one nitrate crystallized out rapidly in well defined crystals.

7 - chloro - 1 - methyl-5-phenyl-1,4-3H-benzodiazepin-2(1H)-one sulfate was also prepared by the above method using sulfuric acid.

The 7-chloro-1-methyl-5-phenyl-1,4-3H-benzodiazepin-2(1H)-one nitrate obtained above was suspended in 300 ml. of ethanol and 20 ml. of 26% aqueous ammonia added thereto with stirring. On warming to 65–70° complete dissolution was obtained giving a slightly yellow to amber colored solution which was treated with 2 g. of decolorizing carbon in two equal parts, and then filtered through diatomaceous earth (Hyflo). The resulting filtrate was permitted to cool, whereupon 7-chloro-1-methyl-5-phenyl-1,4-3H-benzodiazepin-2(1H)-one crystallized out in the form of well defined crystals. The slurry was then stirred at room temperature for one hour, filtered and washed with 50 ml. of ethanol in two equal parts. To remove any co-crystallized ammonium nitrate, the crystalline product was next washed with 200 ml. of hot water (60°). The product was recrystallized directly from ethanol and formed prisms melting at 129–130.5° (uncorr.), and, on examination by thin layer chromatography, showed only one spot, the desired compound 7-chloro-1-methyl-5-phenyl-1,4-3H-benzodiazepin-2(1H)-one. Further purification was effected by dissolving 50 g. of the so-obtained 7-chloro-1-methyl-5-phenyl-1,4-3H-benzodiazepin-2(1H)-one in 150 ml. of ethanol with stirring and heating. The resulting solution was treated with 1.0 g. of decolorizing carbon in two equal parts and then filtered through diatomaceous earth (Hyflo), and the filtrate stirred for one hour after it reached room temperature. The slurry of crystals so-obtained was then filtered with suction and washed with 2 ml. of ethanol at room temperature in two equal parts thereby yielding 7-chloro-1-methyl-5-phenyl-1,4-3H-benzodiazepin-2(1H)-one as prisms melting at 130–131° (uncorr). A separate determination by the U.S. Pharmacopeia method gave a melting point of 131.5–134.5°.

As shown above, the heating of the base, lower alkanol and mineral acid salt of 7-chloro-1-methyl-5-phenyl-1,4-3H-benezodiazepin-2(1H)-one is to the point of complete conversion. In the case of the nitrate, where the soluble ammonium nitrate is formed, the heating would take place until complete dissolution of the ingredients is effected. In the case of the sulfate, where the insoluble ammonium sulfate is formed, complete conversion would be demonstrated when excess ammonia is present.

I claim:
1. A process which comprises
   treating crude 7-chloro-1-methyl-5-phenyl-1,4-3H-benzodiazepin-2(1H)-one with dilute hydrochloric acid;
   separating the resulting insoluble material;
   treating the resulting liquor with a mineral acid selected from the group consisting of nitric acid and sulfuric acid;
   isolating the resulting insoluble material and mixing same in the presence of a lower alkanol with a base;
   heating the resulting mixture to a temperature sufficient to effect complete conversion;
   permitting the resulting solution to cool; and
   separating the purified 7-chloro-1-methyl-5-phenyl-1,4-3H-benzodiazepin-2(1H)-one.
2. A process as in claim 1 wherein the dilute hydrochloric acid is of a strength ca. 3 normal.
3. A process as in claim 1 wherein the mineral acid is nitric acid.
4. A process as in claim 1 wherein the lower alkanol is ethanol.
5. A process as in claim 1 wherein the base is ammonia.
6. A process as in claim 5 wherein the ammonia is added in the form of saturated aqueous ammonia solution.
7. A process which comprises
   treating crude 7-chloro-1-methyl-5-phenyl-1,4-3H-benzodiazepin-2(1H)-one with dilute hydrochloric acid;
   separating the resulting insoluble material;
   treating the resulting liquor with nitric acid;
   isolating the resulting insoluble material and mixing same in the presence of ethanol with a saturated aqueous ammonia solution;
   heating the resulting mixture to a temperature sufficient to effect complete dissolution;
   permitting the resulting solution to cool to room temperature;
   separating the purified 7-chloro-1-methyl-5-phenyl-3H-1,4-benzodiazepin-2(1H)-one.

No references cited.